UNITED STATES PATENT OFFICE.

HEINRICH AUGUST BERNTHSEN, OF MANNHEIM, GERMANY, ASSIGNOR TO THE BADISCHE ANILIN AND SODA FABRIK, OF LUDWIGSHAFEN, GERMANY.

BLUISH-RED DYE AND PROCESS OF MAKING SAME.

SPECIFICATION forming part of Letters Patent No. 645,781, dated March 20, 1900.

Application filed December 27, 1897. Serial No. 663,716. (Specimens.)

*To all whom it may concern:*

Be it known that I, HEINRICH AUGUST BERNTHSEN, doctor of philosophy, a subject of the King of Prussia, Emperor of Germany, residing at Mannheim, in the Grand Duchy of Baden and Empire of Germany, have invented new and useful Improvements in the Manufacture of Coloring-Matters of the Rhodamin Series, of which the following is a specification.

In the French Patent No. 186,607, of May 11, 1897, it has been described that the monobenzylated rhodamins which are characterized by having an alkyl in the amido group bearing the benzyl group by sulfonation yield coloring-matters of great value. Now I have found that also monobenzylated diethyl (dimethyl) rhodamin which has no alkyl in the amido group bearing the benzyl group and which can be obtained by the condensation of molecular proportions of dimethyl (diethyl) para-amido-ortho-oxy-benzoyl-benzoic acid with benzyl-meta-amido-phenol can in the same manner be sulfonated either with concentrated sulfuric acid at the temperature of a water-bath or with fuming sulfuric acid in the cold, whereby the sulfoacid obtained by the treatment with concentrated sulfuric acid dyes tannin-mordanted cotton, while that obtained by treating the rhodamins with fuming sulfuric acid dyes wool beautiful red shades with weak yellow fluorescence.

The following examples will serve to illustrate the manner in which my invention can best be carried into practical effect. The parts are by weight:

Example 1: Dissolve one (1) part of diethyl (dimethyl) benzyl-rhodamin sulfate or base in about seven (7) parts of ordinary concentrated sulfuric acid and warm on the water-bath until a test portion dissolves in dilute soda solution, which will be effected in a very short time. Then pour the mass into ten (10) parts of water, filter the separated sulfoacid, dissolve it in hot water, adding the necessary quantity of sodium carbonate, and salt out the sodium salt formed with common salt. The sodium salt so obtained is a red powder which dissolves easily in water with a reddish-yellow color and dyes tannin-mordanted cotton with bluish-red and wool with red shades possessing a yellow fluorescence.

Example 2: Dissolve one (1) part of the diethyl (dimethyl) benzyl-rhodamin sulfate or base in about five (5) parts of fuming sulfuric acid of thirty per cent. $SO_3$ while cooling, so that a temperature of ten degrees centigrade (10° C.) is not exceeded. When solution has taken place, pour at once upon a not-too-abundant quantity—say two or four times its weight—of ice and water. The separated sulfoacid, which is more soluble in water than that obtained with ordinary sulfuric acid, is converted into the sodium salt in the manner described in the foregoing Example 1. This sodium salt is a red powder easily soluble in water with a bluish-red color and dyes wool from the acid-bath brilliant bluish-red shades with weak yellow fluorescence. It is soluble in concentrated sulfuric acid with a yellow color and is more particularly characterized by its absorption spectrum in weak acetic-acid solution in that a band the center of which corresponds to the wave length of about 551 in the green is absorbed.

What I claim is—

1. The process for the manufacture of a new coloring-matter of the rhodamin series by treating the mono-benzylated-di-alkylated rhodamin hereinbefore defined with fuming sulfuric acid, substantially as hereinbefore described.

2. As a new article of manufacture the acid dyestuff which can be derived from the monobenzylated-di-alkylated rhodamin hereinbefore defined, and fuming sulfuric acid, which is a red powder, soluble in water, dyeing wool from an acid-bath, giving bluish-red shades with weak yellowish fluorescence, and which gives a yellow color in concentrated sulfuric acid, and is particularly characterized by its absorption spectrum in a weak acetic-acid solution, in that a band the center of which corresponds to the wave length of about 551 is absorbed.

In testimony whereof I have hereunto set my hand in the presence of two subscribing witnesses.

HEINRICH AUGUST BERNTHSEN.

Witnesses:
GUSTAV L. LIETTENBERGER,
BERNHARD C. HESSE.

Correction in Letters Patent No. 645,781.

It is hereby certified that in Letters Patent No. 645,781, granted March 20, 1900, upon the application of Heinrich August Bernthsen, of Mannheim, Germany, for an improvement in "Bluish-Red Dye and Process of Making Same," an error appears in the printed specification requiring correction, as follows: In line 11, page 1, the number of the French patent, "186,607," should read *186,697;* and that the said Letters Patent should be read with this correction therein that the same may conform to the record of the case in the Patent Office.

Signed, countersigned, and sealed this 19th day of June, A. D., 1900.

[SEAL.]
                F. L. CAMPBELL,
                *Assistant Secretary of the Interior.*

Countersigned:
  WALTER H. CHAMBERLIN,
    *Acting Commissioner of Patents.*